United States Patent [19]
Izukawa

[11] Patent Number: 6,041,189
[45] Date of Patent: Mar. 21, 2000

[54] CAMERA SYSTEM, CAMERA AND CAMERA-ACCESSORY

[75] Inventor: Kazuhiro Izukawa, Misato, Japan

[73] Assignee: Canon Kabushiki Kaisha, Tokyo, Japan

[21] Appl. No.: 09/128,650

[22] Filed: Aug. 4, 1998

[30] Foreign Application Priority Data

Aug. 25, 1997 [JP] Japan ................................. 9-241689
Sep. 11, 1997 [JP] Japan ................................. 9-247038

[51] Int. Cl.⁷ .................................................. G03B 7/26

[52] U.S. Cl. ......................... 396/277; 396/301; 396/529

[58] Field of Search ............................ 396/129, 301, 396/302, 303, 91, 529, 277, 279

[56] References Cited

U.S. PATENT DOCUMENTS

5,727,241  3/1998  Yamano et al. ........................ 396/303

*Primary Examiner*—W. B. Perkey
*Attorney, Agent, or Firm*—Robin, Blecker & Daley

[57] ABSTRACT

In a camera system composed of a camera capable of containing a battery therein and an accessory capable of being detachably mounted on the camera and being supplied with electric power from the camera, communication is possible between the camera and the accessory, and the accessory, upon receiving an instruction from the camera, performs an operation according to the received instruction. The camera system is provided with a circuit which sends an instruction designating a value corresponding to electric power usable by the accessory from the camera to the accessory, to decide a working power or voltage usable in the accessory.

38 Claims, 7 Drawing Sheets

FIG. 6

CAMERA SYSTEM, CAMERA AND CAMERA-ACCESSORY

BACKGROUND OF THE INVENTION

1. Field of the Invention

The present invention relates to a camera and an accessory, such as an interchangeable lens or the like, arranged to be capable of communicating with each other.

2. Description of Related Art

In a conventional camera system composed of a camera body and an accessory, mounted on the camera body, arranged to be capable of communicating with each other, a maximum amount of electric power to be supplied from the camera body to the accessory is determined beforehand, and the accessory is made to operate within the limit of such a maximum amount of electric power. This limit is set for the purpose of saving operations to be performed on the side of the camera body from being affected by the operation of the accessory even when the remaining amount of electric energy of a battery mounted on the camera body is small. An example of this arrangement was disclosed in Japanese Laid-Open Patent Application No. HEI 7-194153, in which the accessory is a lens having a built-in vibration wave motor for lens driving.

As for the conventional communication between a camera body and an accessory in the camera system, a single communication method only is employed, for example, as disclosed in Japanese Laid-Open Patent Application No. HEI 6-3582.

As mentioned above, in the conventional camera system, the maximum amount of electric power to be supplied from the camera body to the accessory is determined beforehand. The accessory is, therefore, allowed to operate only within the predetermined limit of electric power even when the power supply battery of the camera body still has a sufficiently large margin in suppliable electric energy. This has presented the following problems.

In a case where the accessory included in a camera system is an interchangeable lens, for example, it is sometimes necessary to move a focusing lens at a faster speed than an ordinary speed in an automatic focusing operation or the like. However, since the focusing lens is arranged to operate only within the limit of the predetermined amount of electric power even when a larger amount of electric energy is available from the power supply battery disposed within the camera body, it has been impossible to carry out a computing operation and other processes at a higher speed by increasing power consumption at a control circuit or to increase a focusing lens driving force by increasing power consumption at a driving circuit. The conventional arrangement thus has been incapable of meeting such a requirement.

Further, the method of the conventional camera systems for communication between a camera body and an accessory has been developed only for the conventional camera systems. Their communication statement is thus arranged also only for the conventional camera systems and is hardly applicable to a system wherein a camera body is arranged to have a new function of designating an electric power to be supplied to an accessory. Therefore, in a case where any special data is required for a new function, the communication becomes impossible, because no instruction can be issued for the special data.

Further, such special data may be communicated by changing the conventional communication method. However, the camera system then might malfunction if the camera system includes the conventional accessory which is not arranged for processing the new communication statement.

BRIEF SUMMARY OF THE INVENTION

In accordance with one aspect of the invention, there is provided a camera system which decides a working power or voltage to be used on the side of an accessory, by sending, from a camera to the accessory, an instruction designating a value corresponding to electric power usable by the accessory.

The above and other aspects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
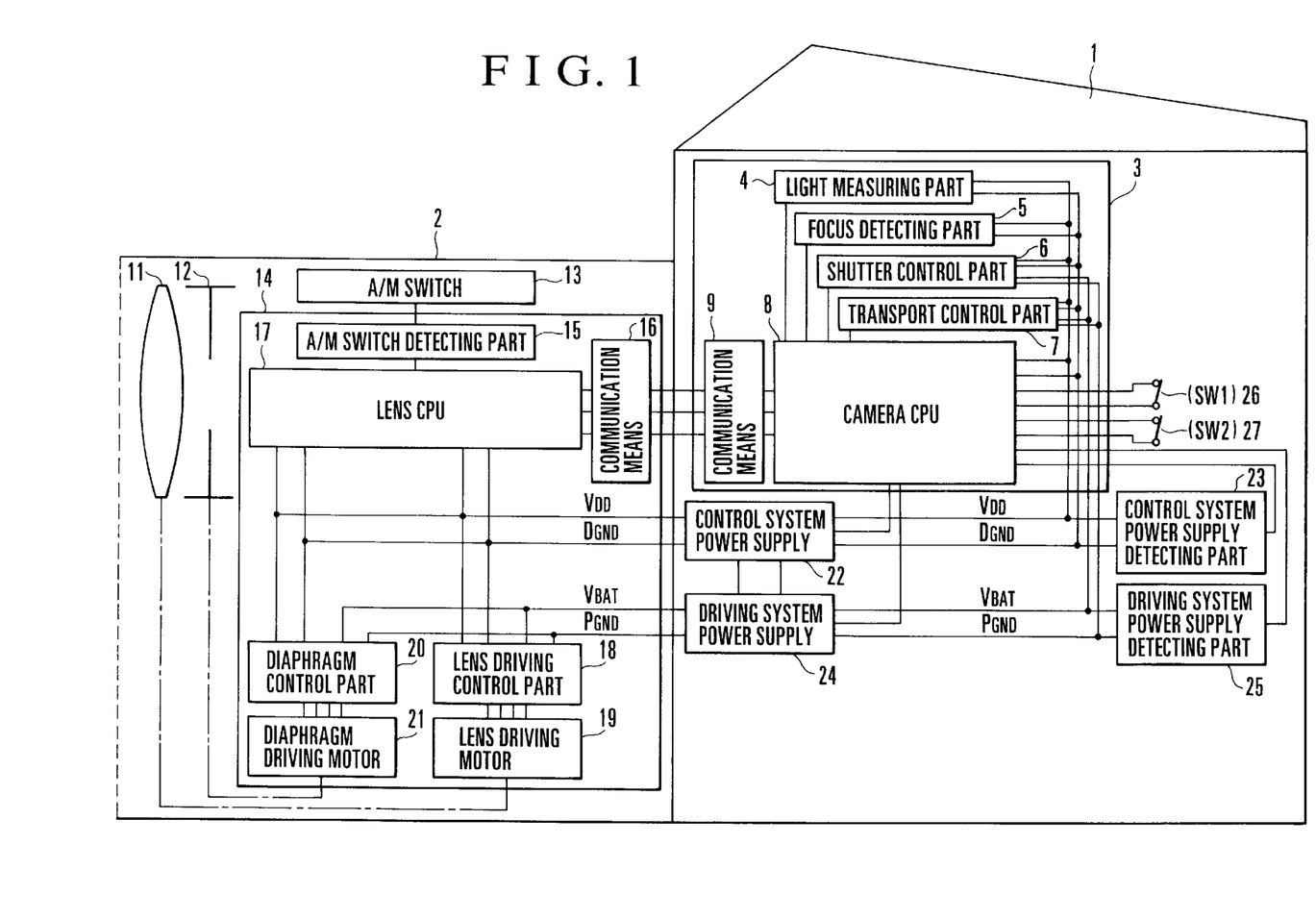
FIG. 1 is a block diagram showing the arrangement of a camera system according to a first embodiment of the invention.

FIG. 1 is a block diagram showing the circuit arrangement of a camera system, according to a first embodiment of the invention, composed of a camera body and an interchangeable lens, serving as an example of an accessory, which are arranged to be capable of communicating with each other.

In FIG. 1, reference numeral 1 denotes the camera body and reference numeral 2 denotes the interchangeable lens which is an accessory.

Referring to FIG. 1, an electric circuit part 3 is arranged within the camera body 1. In the electric circuit part 3, a light measuring part 4 is arranged to measure the quantity of light of an object coming through the above-stated interchangeable lens 2. A focus detecting part 5 is arranged to measure a distance from a film surface to an object to be photographed or to detect the focus state of a photo-taking optical system disposed inside of the interchangeable lens 2. A shutter control part 6 is arranged to control and obtain an opposite length of time of exposing the film to light. A transport control part 7 is arranged to control film winding and rewinding actions. A camera CPU 8 is arranged to control these parts within the camera body 1. Communication means 9 is provided inside of the camera body 1 for serial communication with the interchangeable lens 2.

The interchangeable lens 2 includes therein a focusing lens 11, a diaphragm 12, an A/M switch 13 which is provided for change-over selection between manual focusing and automatic focusing, and an electric circuit part 14. The electric circuit part 14 includes an A/M switch state detecting part 15 arranged to detect the state of the A/M switch 13, communication means 16 which is provided for serial communication with the camera body 1, a lens CPU 17 arranged to control the parts within the interchangeable lens 2, a lens driving control part 18 arranged to control a driving action on the focusing lens 11, a lens driving motor 19 arranged to drive the focusing lens 11, a diaphragm control part 20 arranged to control a driving action on the diaphragm 12, and a diaphragm driving motor 21 arranged to drive the diaphragm 12.

Further, within the camera body 1, there is provided a control system power supply 22. The control system power supply part 22 is arranged to supply electric power, according to outputs from the camera CPU 8, to the control system circuits which consume a relatively small amount of power and require a stable voltage, such as the light measuring part 4, the focus detecting part 5, the camera CPU 8, and the lens CPU 17 disposed within the interchangeable lens 2. A control system power supply detecting part 23 is arranged to detect the voltage and electric energy of the control system power supply 22. A driving system power supply 24 is arranged to supply electric power, according to outputs of the camera CPU 8, to the driving system circuits which consume a relatively large amount of power, such as the shutter control part 6, the transport control part 7, the lens driving control part 18 and the diaphragm control part 20. A driving system power supply detecting part 25 is arranged to detect the voltage and electric energy of the driving system power supply 24. A switch 26 (SW1) is provided for causing the light measuring part 4 to begin to act. A switch 27 (SW2) is provided for causing the focus detecting (distance measuring) part 5 and the shutter control part 6 to begin to act.

Figure 2:
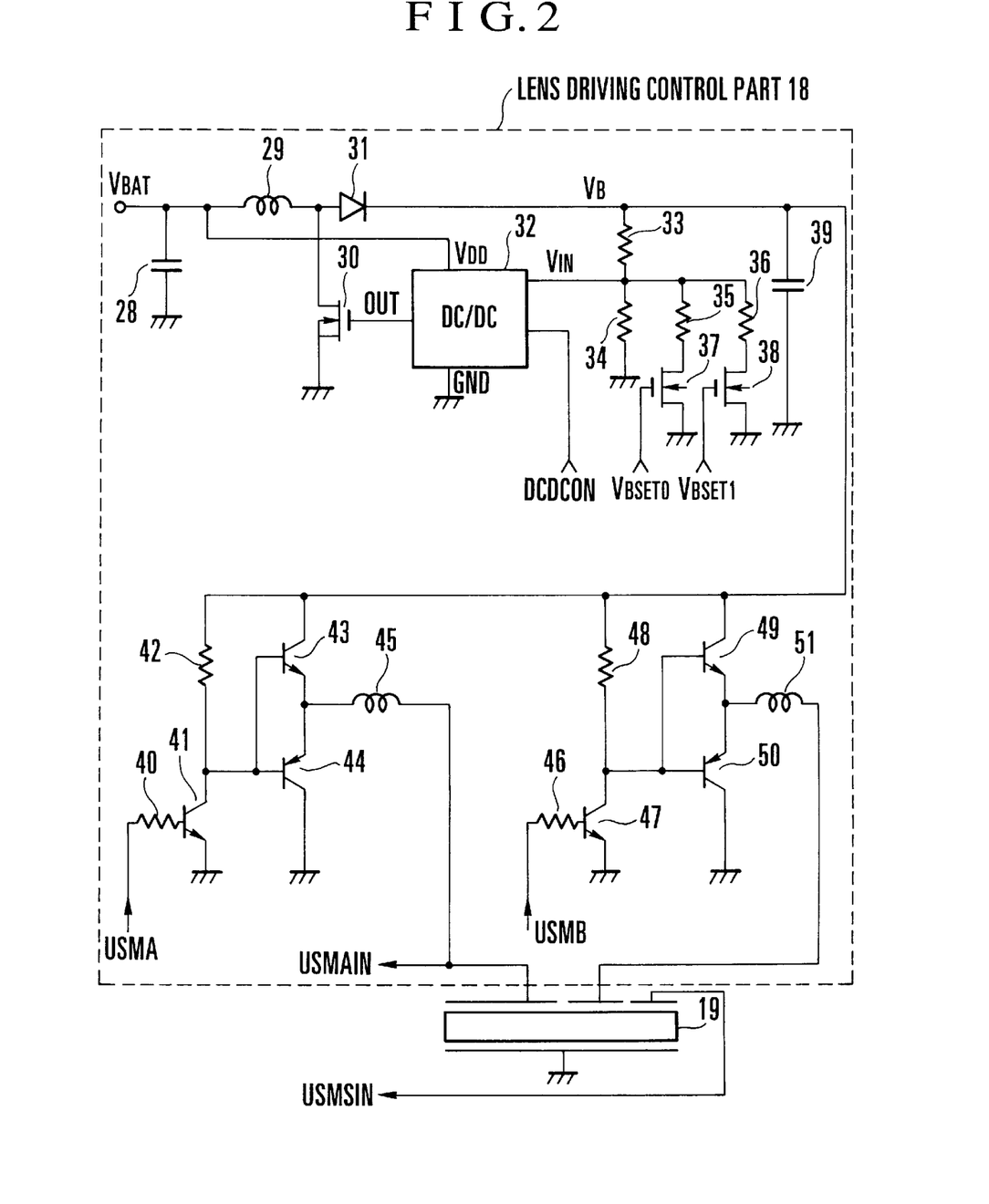
FIG. 2 is a circuit diagram showing the details of a lens driving control part and a lens driving motor in the camera system shown in FIG. 1.

FIG. 2 is a circuit diagram showing the details of the lens driving control part 18 and the lens driving motor 19 shown on the side of the interchangeable lens 2 in FIG. 1.

Referring to FIG. 2, an upper circuit part thereof represents a booster circuit provided for boosting the voltage of the driving system power supply 24 coming from the camera body 1 up to a vibration wave motor driving voltage $V_B$. The lower circuit part of FIG. 2 represents a switching circuit which is provided for switching the output voltage $V_B$ the above-stated booster circuit at a vibration wave motor driving frequency.

In the booster circuit shown at the upper part of FIG. 2, a capacitor 28, which is connected to the driving system power supply 24, is arranged to keep the output of the driving system power supply 24 constant. The booster circuit also includes a coil 29, a switching element 30, a Schottky diode 31, a DC/DC converter circuit 32, voltage dividing resistors 33, 34, 35 and 36, and switching elements 37 and 38. Another capacitor 39, to which the vibration wave motor driving voltage $V_B$ is applied, is arranged to keep the output of the vibration wave motor driving voltage $V_B$ constant.

Operation of the booster circuit configured as described above is described as follows.

In an initial stage, an input DCDCON is caused to be at a logical "0", i.e., DCDCON=0, by an output of the lens CPU 17. Other inputs $V_{BSET0}$ and $V_{BSET1}$ are respectively at $V_{BSET1}=0$, $V_{BSET1}=0$. In this stage, both the switching elements 37 and 38 are in the off-state.

When the output of the lens CPU 17 causes the input DCDCON to be at "1", the DC/DC converter circuit 32 changes an ON/OFF time ratio of the switching element 30 by controlling the output voltage of its terminal OUT in such a way as to make a voltage $V_{IN}$, obtained by dividing the vibration wave motor driving voltage $V_B$ with the resistors 33 and 34 and an internal reference voltage $V_{REF}$ constant. The vibration wave motor driving voltage $V_B$ obtained at this time is assumed to be "$V_{B0}$".

When the voltage of the terminal OUT is caused to be at a high level (H), the switching element 30 turns on to allow a current to flow through the coil 29 to store energy. When the voltage level of the terminal OUT is caused to become low (L), the switching element 30 turns off to allow the energy stored at the coil 29 to be outputted via the Schottky diode 31 as the vibration wave motor driving voltage $V_B$. The larger the value of the current flowing to the coil 29, the larger the energy stored at the coil 29.

When the booster circuit takes a state wherein the switching element 37 is in the on-state and the switch element 38 in the off-state, i.e., "$V_{BSET0}=1$ and $V_{BSET1}=0$", the voltage $V_{IN}$ becomes a value obtained by dividing the vibration wave motor driving voltage $V_B$ through the resistor 33 and a parallel resistance of the resistors 34 and 35 which has a smaller resistance value than a resistance value obtained through the resistor 34 alone. Therefore, the vibration wave motor driving voltage $V_B$ becomes higher in this state. The vibration wave motor driving voltage $V_B$ obtained in this state is assumed to be "$V_{B1}$".

In the same manner as described above, the vibration wave motor driving voltage $V_B$ obtained when the booster circuit is in a state of "$V_{BSET0}=0$ and $V_{BSET1}=1$" is assumed to be "$V_{B2}$". The vibration wave motor driving voltage $V_B$ obtained when the booster circuit is in a state of "$V_{BSET0}=1$ and $V_{BSET1}=1$" is assumed to be "$V_{B3}$".

The switching circuit, which is shown in the lower part of FIG. 2, includes resistors 40, 42, 46 and 48, NPN transistors 41, 43, 47 and 49, PNP transistors 44 and 50, and coils 45 and 51.

To the NPN transistors 41 and 47, two-phase driving frequency signals USMA and USMB for driving the lens driving motor 19, which is a vibration wave motor, are inputted from the lens CPU 17 through the resistors 40 and 46, respectively. The NPN transistors 43 and 49 and the PNP transistors 44 and 50 are arranged to power-amplify the outputs of the NPN transistors 41 and 47 through the resistors 42 and 48. The amplified outputs of the NPN transistor 41 and 47 are supplied to the lens driving motor 19 through the coils 45 and 51.

Signals USMAIN and USMSIN for monitoring a vibrating condition of the lens driving motor 19 are outputted from the lens driving motor 19 to the lens CPU 17. Then, on the basis of these signals and the output of a driving speed detecting means (not shown), the lens CPU 17 controls the frequency and ON/OFF ratio of the two-phase driving frequency signals USMA and USMB for the lens driving motor 19.

Figure 3:
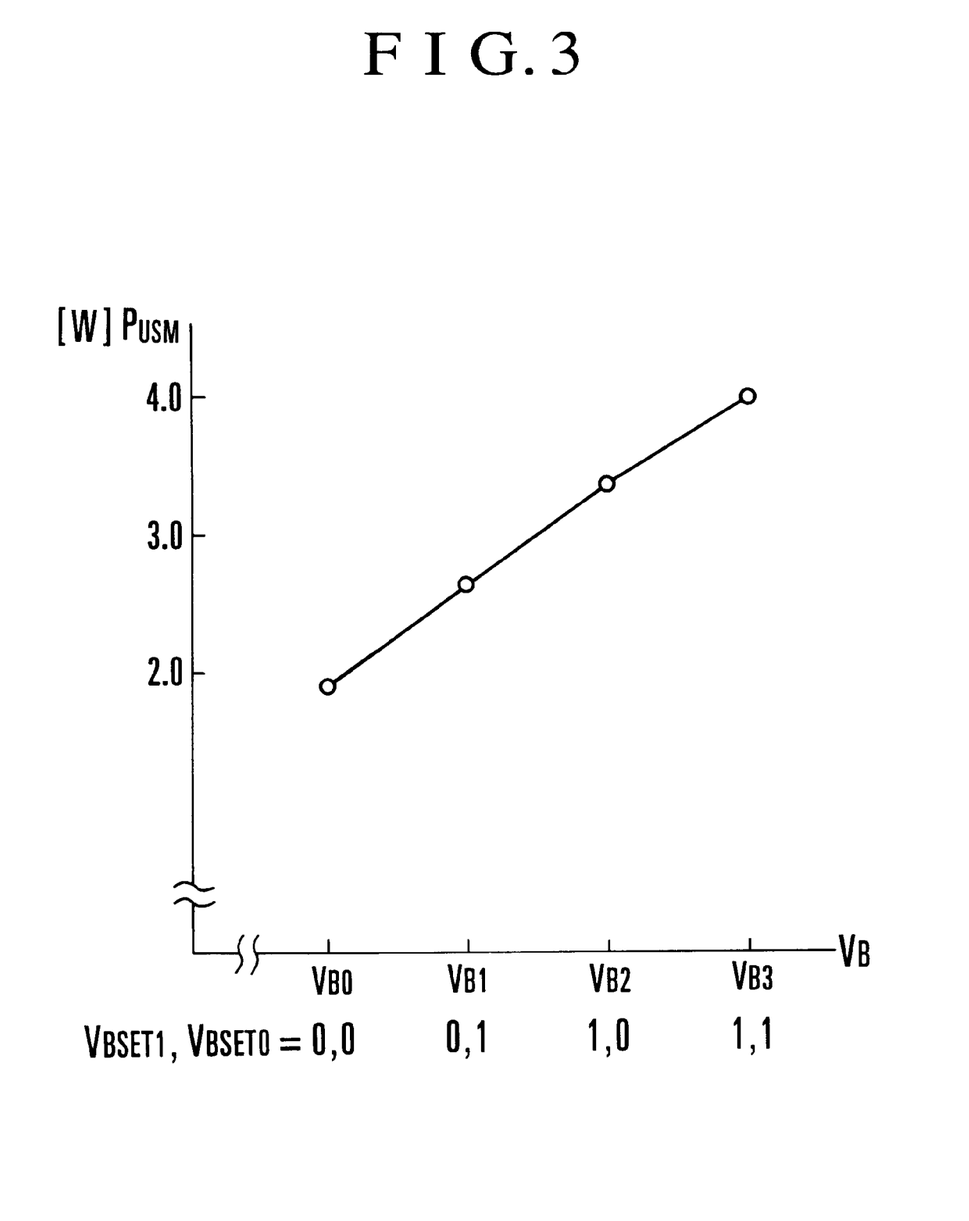
FIG. 3 is a graph showing the relationship between a voltage $V_3$ shown in FIG. 2 and electric power $P_{USM}$ consumed by the lens driving control part and the lens driving motor.

FIG. 3 is a graph showing the relationship between the vibration wave motor driving voltage $V_B$ and the power $P_{USM}$ consumed by the lens driving control part 18 and the lens driving motor 19.

Figure 4:
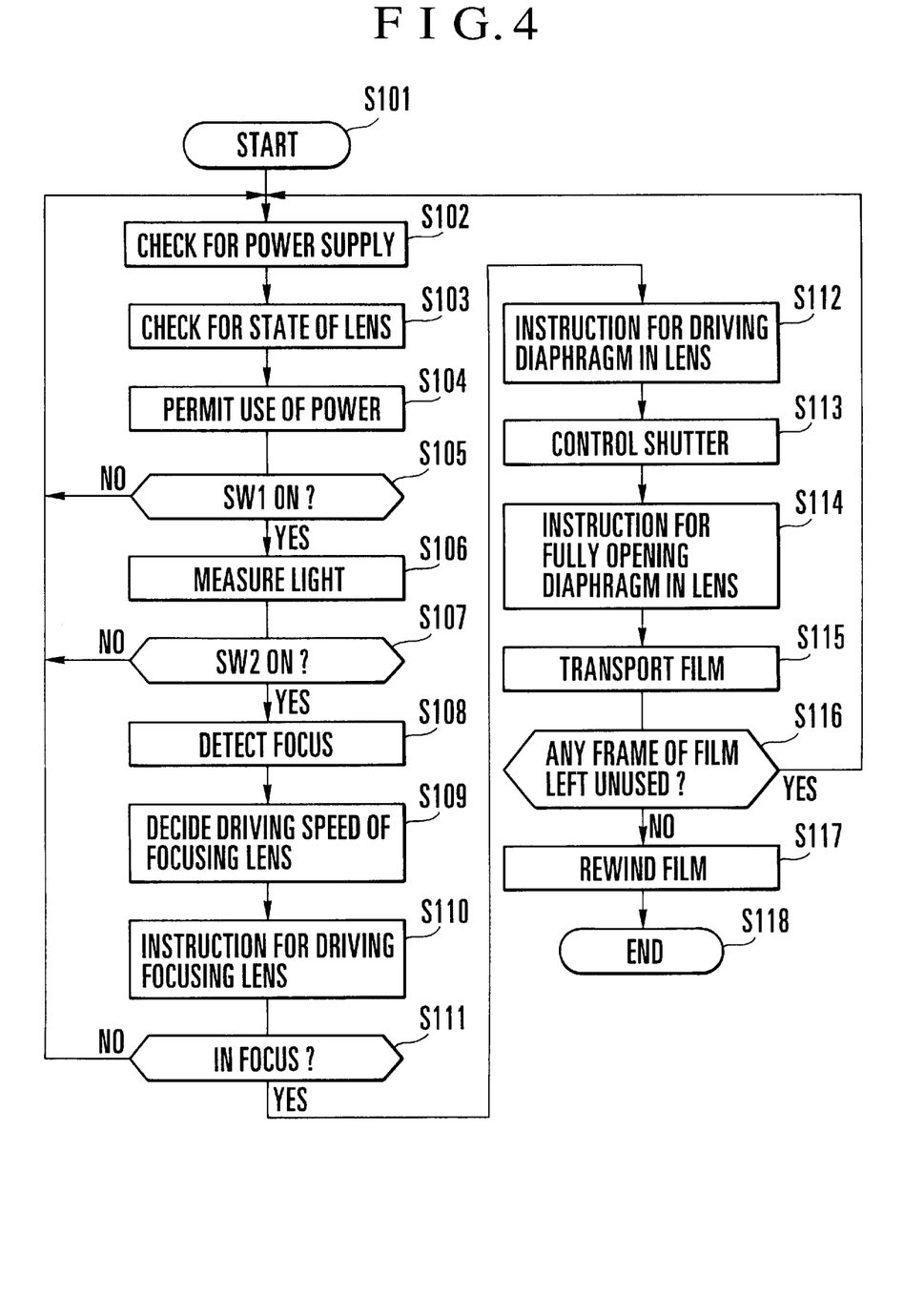
FIG. 4 is a flow chart showing an operation of a camera CPU disposed within a camera in the camera system shown in FIG. 1.
Figure 5:
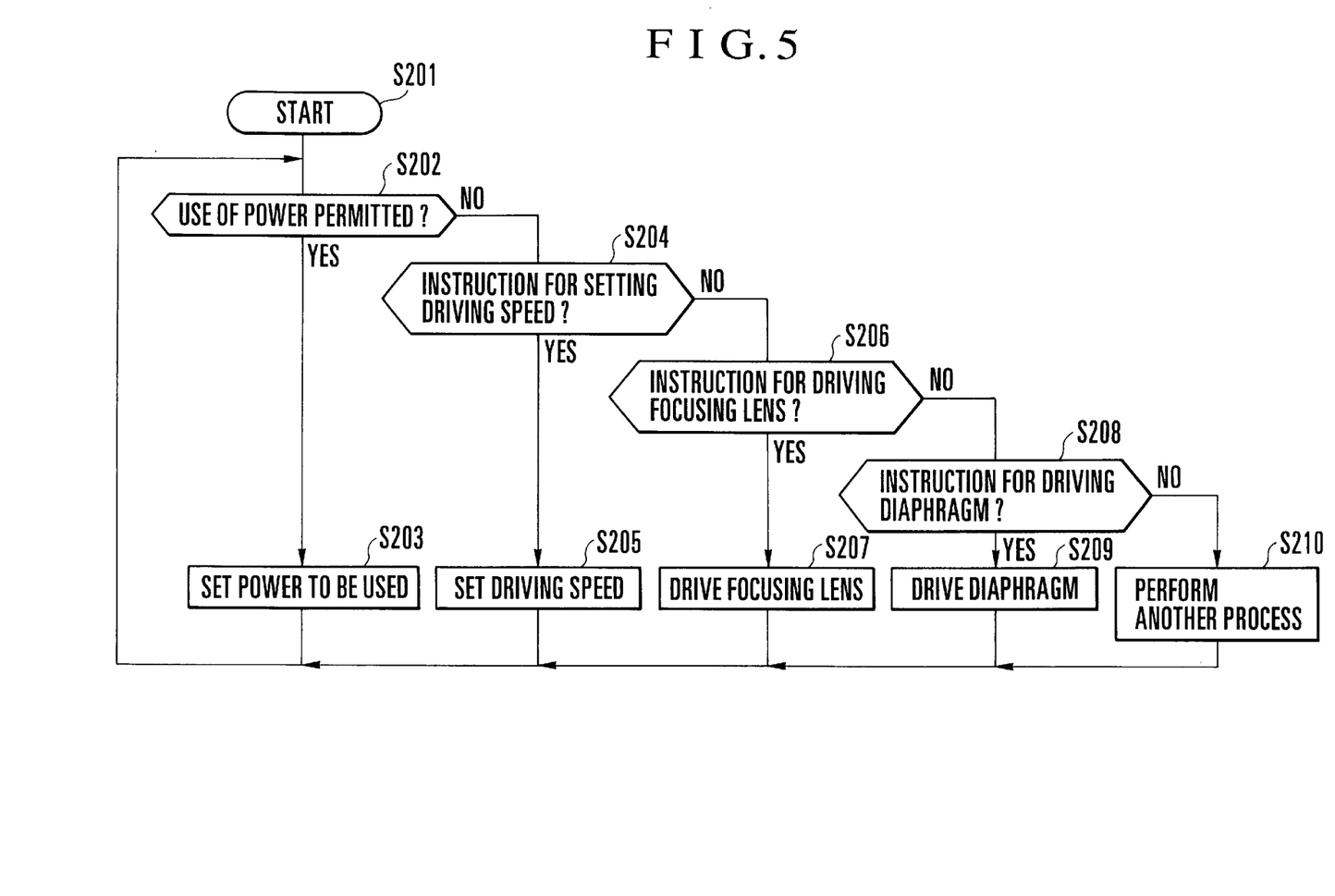
FIG. 5 is a flow chart showing an operation of a lens CPU disposed within a lens in the camera system shown in FIG. 1.

Operations to be performed on the side of the camera body 1 and on the side of the interchangeable lens 2 are next described below with reference to FIGS. 4 and 5, which are flow charts.

First, the operation of the camera body 1 is described with reference to the flow chart of FIG. 4.

When a power supply switch (not shown) turns on, the camera CPU 8 which is disposed within the camera body 1 begins to operate at a step S101. At a step S102, the camera CPU 8 then causes the control system power supply detecting part 23 to detect the state of the control system power supply 22 and also causes the driving system power supply detecting part 25 to detect the state of the driving system power supply 24. If the battery is new, both the control system power supply 22 and the driving system power supply 24 have sufficiently large margins for the supply of electric energy. If the battery is old or consumed, on the other hand, both the control system power supply 22 and the driving system power supply 24 do not have any margin for electric energy supply.

At the next step S103, the camera body 1 and the interchangeable lens 2 begin to conduct a serial eight-bit communication with each other through the communication means 9 and 16. A serial clock signal is supplied from the side of the camera body 1. In synchronism with the serial clock signal, a communication statement is sent from the camera body 1 to the interchangeable lens 2. Meanwhile, data for a communication statement last received from the camera body 1 is sent from the side of the interchangeable lens 2 to the camera body 1. By this step, the state of the interchangeable lens 2 mounted on the camera body 1 and the power consumption of the interchangeable are verified through the communication.

The working power levels (maximum levels) which are permissible for the interchangeable lens 2 are set beforehand, for example, as follows:

The control system power supply 22:

working power level 1: 0.250 W working power level 2: 0.275 W working power level 3: 0.300 W The driving system power supply 24:

working power level 1: 2.0 W working power level 2: 3.0 W working power level 3: 4.0 W The data of the above-stated levels 1 to 3 are stored in every interchangeable lens. Therefore, the data of the working power level values for the control system power supply 22 and the driving system power supply 24 required by the interchangeable lens 2 mounted on the camera body 1 are sent from the interchangeable lens 2 to the camera body 1 by the above-stated data communication.

At the next step S104, a value of electric power suppliable to the interchangeable lens 2 is decided according to the results of the steps S102 and S103. Then, information on the working power level value of the control system power supply 22 and that of the driving system power supply 24 usable for the interchangeable lens 2 is communicated to the interchangeable lens 2.

For example, in a case where the interchangeable lens 2 has sent data indicating that the working power level value of the control system power supply 22 and that of the driving system power supply 24 are respectively at the level 3 (0.300 W) and the level 3 (4.0 W), the camera body 1 informs the interchangeable lens 2 of the electric power values which are suppliable to the interchangeable lens 2 and decided, within a range not exceeding the above-stated power level values, according to the states of the power supplies detected at the step S102 and the power consumption of the camera body 1 in a mode set by a switch (not shown), so that, for example, the camera body 1 informs the interchangeable lens 2 that the suppliable power values are at the level 2 (0.275 W) and the level 2 (3.0 W), respectively. The above-stated mode is a single shooting mode or a continuous shooting mode for film transport, or a one-shot mode or a servo mode for automatic focusing, or a mode of having a plurality of distance measuring points (focus detecting points), or a mode of using a flash device. The load on the camera body 1 varies according to the selection of these operating modes.

At a step S105, a check is made to find if the switch SW1 is in the on-state. If not, the flow of operation returns to the step S102 to repeat the above-stated steps.

When the switch SW1 turns on, the flow proceeds from the step S105 to a step S106. At the step S106, a shutter speed and an aperture value are decided on the basis of an output of the light measuring part 4 and the F-number of the interchangeable lens 2 mounted on the camera body 1. At a step S107, a check is made to find if the switch SW2 is in the on-state. If not, the flow returns to the step S102. If so, the flow proceeds to a step S108.

At the step S108, the amount of movement of the focusing lens 11 is obtained from an output of the distance measuring or focus detecting part 5 and optical information on the interchangeable lens 2 mounted. At a step S109, the driving speed of the focusing lens 11 (concretely, a maximum moving speed of the focusing lens 11) is decided according to the output of the distance measuring or focus detecting part 5 and the optical information on the interchangeable lens 2. Then, information on the amount of movement and the driving speed of the focusing lens 11 is sent to the interchangeable lens 2. At the next step S110, an instruction is sent to the interchangeable lens 2 for the commencement of moving the focusing lens 11 by the moving amount set at the step S108 and at the driving speed decided at the step S109. At a step S111, a check is made to find if the focusing lens 11 of the interchangeable lens 2 mounted is at an in-focus position, by examining an output of the distance measuring or focus detecting part 5 and also optical information on the interchangeable lens 2. If not, the flow returns to the step S102 to repeat the light measuring step, the distance measuring or focus detecting step, etc.

When the focusing lens 11 is found to be at the in-focus position, the flow proceeds from the step S111 to a step S112. At the step S112, an instruction is sent to the interchangeable lens 2 for driving the diaphragm 12 to an aperture position set at the step S106. At a step S113, the shutter control part 6 is caused to open and close a shutter (not shown) at a shutter speed decided at the step S106. At a step S114, an instruction is sent to the interchangeable lens 2 for driving the diaphragm 12 to its full open position. At a step S115, the film transport control part 7 is caused to transport a film (not shown) to en extent corresponding to one frame.

At a step S116, a check is made to find if the film transport control part 7 has been able to move the film to the extent of one frame at the step S115. If so, the flow returns to the step S102 for the next photo-taking operation. If not, the film is assumed to have no photographable frame portion thereof left there any longer, and the flow proceeds to a step S117. At the step S117, the film transport control part 7 is caused to perform the rewinding of film. At a step S118, a sequence of processes comes to an end.

Next, the operation to be performed on the side of the interchangeable lens 2 in response to instructions received from the camera body 1 through communication as mentioned above is described below with reference to the flow chart of FIG. 5.

Upon receipt of an instruction from the camera body 1 through communication, the lens CPU 17 which is disposed on the side of the interchangeable lens 2 begins to operate at a step S201, and the instruction is analyzed at a step S202 and subsequent steps.

At the step S202, a check is made to find if the instruction received from the camera body 1 is the information sent at the above-stated step S104. In other words, the instruction from the camera body 1 is examined to find if it indicates the level value of working power of the control system power supply 22 and that of working power of the driving system power supply 24 usable for the interchangeable lens 2. If so, the flow of operation proceeds to a step S203 to process the instruction which indicates the working power level value of the control system power supply 22 and that of the driving system power supply 24 which are useable by the interchangeable lens 2.

The levels of electric power usable by the interchangeable lens 2 are set beforehand, for example, as follows:

The control system power supply 22:

working power level 1: 0.250 W working power level 2: 0.275 W working power level 3: 0.300 W The driving system power supply 24:

working power level 1: 2.0 W working power level 2: 3.0 W working power level 3: 4.0 W The control system power supply 22 and the driving system power supply 24 are used as follows.

The use of the control system power supply 22

Suppose that the power of the control system power supply 22 to be used by the interchangeable lens 2 is required to be 0.280 W if an operating clock frequency of the lens CPU 17 within the interchangeable lens 2 is 8 MHz, for example, and the power of the control system power supply 22 to be used by the interchangeable lens 2 is required to be 0.240 W if the operating clock frequency is 4 MHz. In this instance, when the working power level value of usable power of the control system power supply 22 indicated in the information coming from the camera body 1 is at "1", the operating clock frequency must be set at 4 MHz.

Further, if the working power level value of usable power of the control system power supply 22 indicated in the information coming from the camera body 1 is at "3", the operating clock frequency is set at 8 MHz, so that the operating speed of the lens CPU 17 can be increased to increase the speed of its computing and processing operations within the interchangeable lens 2.

The use of the driving system power supply 24

According to FIG. 3 which shows the relationship between the vibration wave motor driving voltage $V_B$ and the power consumed by the lens driving control part 18 and the lens driving motor 19, the use of the driving system power supply 24 becomes as shown below:

when $V_{BSET0}=0$, $V_{BSET1}=0$: about 2.0 W when $V_{BSET0}=1$, $V_{BSET1}=0$: about 2.6 W when $V_{BSET0}=0$, $V_{BSET1}=1$: about 3.3 W when $V_{BSET0}=1$, $V_{BSET1}=1$: about 4.0 W In this instance, when the working power level value of usable power of the driving system power supply 24 indicated in the information from the camera body 1 is at "1", the inputs must be set at "$V_{BSET0}=0$, $V_{BSET1}=0$".

Further, when the working power level value of usable power of the driving system power supply 24 indicated in the information from the camera body 1 is at "2", the speed of driving the focusing lens 11 can be increased by setting the inputs at "$V_{BSET0}=1$, $V_{BSET1}=0$".

After completion of the process mentioned above, the flow of operation returns to the step S202.

When the instruction to the interchangeable lens 2 is found at the step S202 to be not indicating the working power level value of the control system power supply 22 and that of the driving system power supply 24, the flow proceeds to a step S204. At the step S204, a check is made to find if the instruction is for setting a speed of driving the focusing lens 11 (a maximum moving speed in this case). If so, the flow of operation proceeds to a step S205. At the step S205, the moving speed of the focusing lens 11 is set, for example, in the following manner.

If the object is of a high contrast, the distance measuring or focusing detecting part 5 can detect focus even if the moving speed of the focusing lens 11 is high. In the case of an object of a low contrast, however, it would be impossible to make focus detection unless the moving speed of the focusing lens 11 is low. In such a case, the moving speed of the focusing lens 11 is set according to the instruction for setting a maximum moving speed of the focusing lens 11 and the working power level value of the driving system power supply 24 included in the information from the camera body 1.

Further, in a case where the battery in use is in a consumed state while the contrast of the object is high, i.e., in case where the maximum moving speed of the focusing lens 11 can be set at a high speed although the suppliable electric power is not much, the moving speed of the focusing lens 11 is set according to the suppliable electric power.

In a case where the battery is new while the object is of a low contrast, contrary to the preceding case, i.e., when the maximum moving speed of the focusing lens 11 cannot be set at a very high speed although the power is available in a large amount, the moving speed of the focusing lens 11 is set according to the maximum moving speed of the focusing lens 11.

After completion of the above setting process, the flow returns to the step S202.

If the instruction from the camera body 1 is found at the step S204 to be not for setting the driving speed of the focusing lens 11, the flow of operation proceeds to a step S206. At the step S206, a check is made to find if the instruction is for driving the focusing lens 11. If so, the flow proceeds to a step S207. At the step S207, the focusing lens 11 is driven in accordance with the instruction received from the camera body 1 for the amount and direction of movement of the focusing lens 11. In this instance, the focusing lens 11 is driven at the moving speed set at the step S205.

After completion of the above driving process, the flow returns to the step S202.

If the instruction from the camera body 1 is found at the step S206 to be not for driving the focusing lens 11, the flow proceeds to a step S208. At the step S208, a check is made to find if the instruction is for driving the diaphragm 12. If so, the flow proceeds to a step S209. At the step S209, the diaphragm 12 is driven in accordance with the instruction from the camera body 1 for the amount and direction of adjusting the aperture position of the diaphragm 12.

After completion of the above process, the flow returns to the step S202.

In a case where the instruction is found at the step S208 to be not for driving the diaphragm 12, the flow of operation proceeds to a step S210. At the step S210, if the instruction is found to be for some other process or action, such as an instruction for providing optical information, for example, the optical information is sent to the camera body 1. Further, if the instruction is found to be given at the step S103 in the camera body 1, information on the level values of the interchangeable lens 2 mentioned in the foregoing is sent to the camera body 1. After that, the flow of operation returns to the step S202.

The arrangement described above enables the first embodiment to increase the amount of power usable by the control system circuit of the interchangeable lens 2, for a high speed computing and processing operation, or to increase the amount of power usable by the driving system circuit of the interchangeable lens 2 for a high speed driving, if there is a wide margin of suppliable power in the power source battery disposed within the camera body 1.

Second Embodiment

Figure 6:
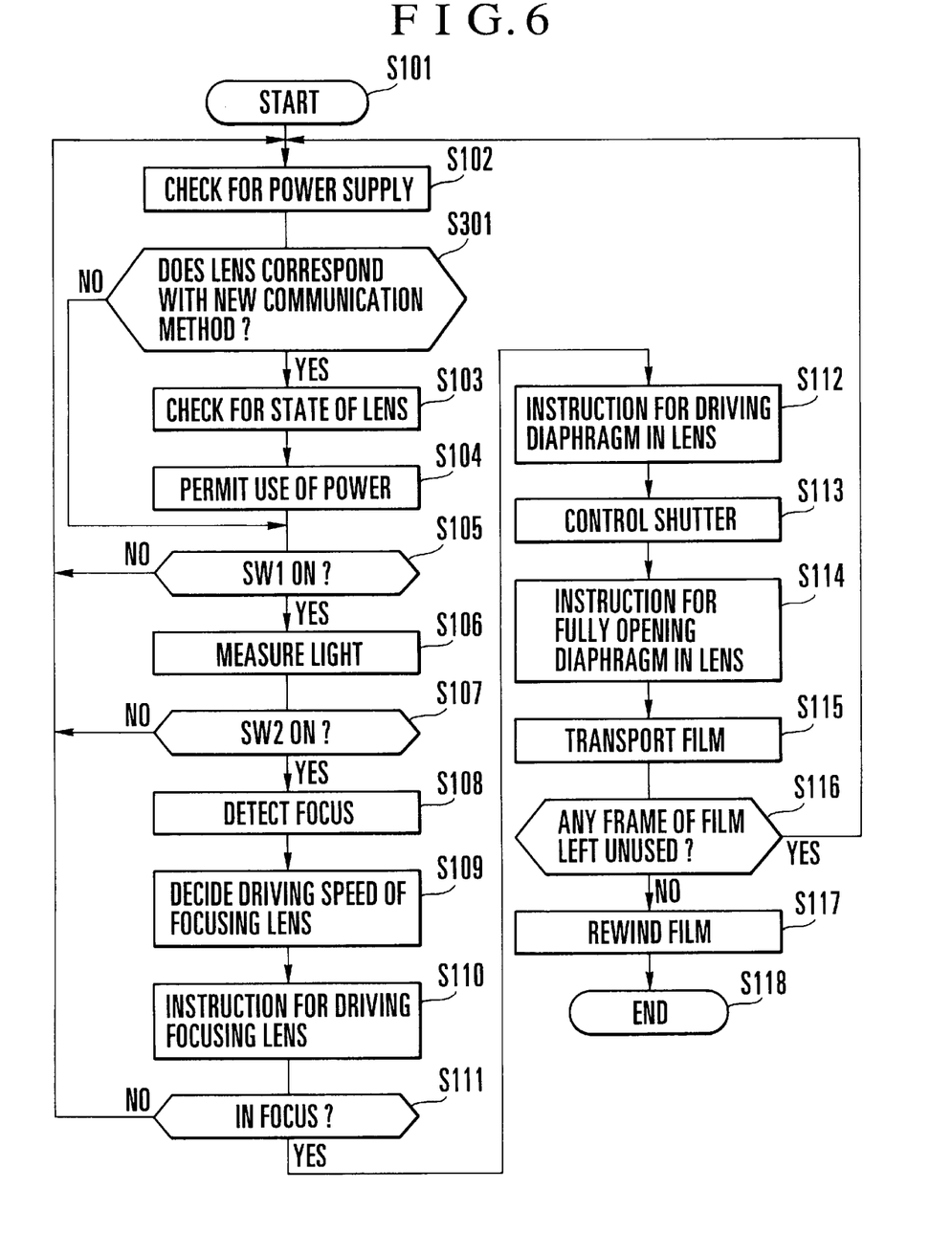
FIG. 6 is a flow chart showing an operation of a camera CPU disposed within a camera in a camera system according to a second embodiment of the invention.
Figure 7:
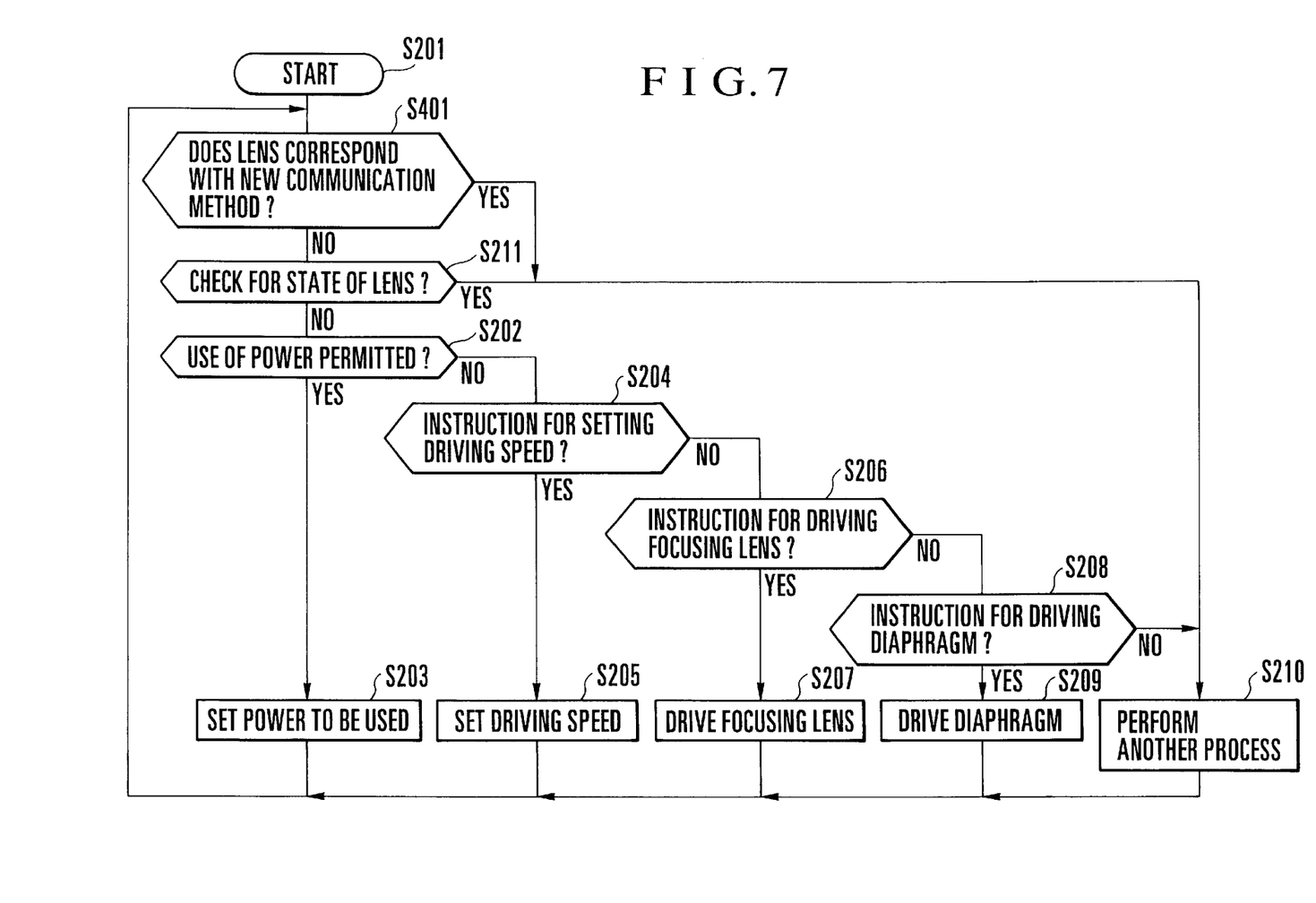
FIG. 7 is a flow chart showing an operation of a lens CPU disposed within a lens in the camera system according to the second embodiment of the invention.

FIGS. 6 and 7 are flow charts showing the operation of a camera system according to a second embodiment of the invention. More specifically, FIG. 6 shows an operation to be performed on the side of a camera body while FIG. 7 shows an operation to be performed on the side of an interchangeable lens which is used, for example, as an accessory. The circuit arrangement of the camera system in the second embodiment is the same as the circuit arrangement in the first embodiment. Therefore, the details of the circuit arrangement of the second embodiment are omitted from the following description.

The operation to be performed by the camera CPU 8 which is disposed on the side of the camera body 1 is first described with reference to the flow chart of FIG. 6. With the exception of a step S301, the operation is exactly the same as that of the first embodiment performed at the steps S101 to S118 of FIG. 4. Therefore, the processes of these steps S101 to S118 are omitted from the following description. In the following description, the conventional method for communication between a camera body and an interchangeable lens is hereinafter will be called a first communication method, and a new method for communication conducted between the camera body and the interchangeable lens according to the second embodiment will be called a second communication method. In the case of the second communication method, a process of setting the level of power to be supplied from the camera body 1 to the interchangeable lens 2 according to data of level values stored within the interchangeable lens 2 is added to the first communication method.

At the step S301 of FIG. 6, an instruction for verifying the communication method is sent from the camera body 1 to the interchangeable lens 2. An answer to the instruction received from the interchangeable lens 2 is checked to find if the interchangeable lens 2 mounted on the camera body 1 corresponds with the second communication method. The check is made through an intrinsic ID code of the interchangeable lens 2 received by communication from the interchangeable lens 2. The ID code is assumed, in this case, to include information indicating whether or not the interchangeable lens 2 corresponds with the second communication method. In some other case, the discrimination between the first and second communication methods may be made by communicating an instruction which is not used by the conventional communication method and by receiving or not receiving information from the interchangeable lens 2 in response to the instruction.

If the arrangement of the interchangeable lens 2 is found through the above-stated verifying process to correspond with the second communication method (new communication), the flow of operation comes to execute the step S103 and steps subsequent to the step S103. The step S103 and the next step S104 are executed in the same manner as in the case of FIG. 4, except that, in the second embodiment, these steps are executed according to instructions given in conformity with the second communication method.

If the arrangement of the interchangeable lens 2 mounted on the camera body 1 is found at the step S301 not to correspond with the second communication method, the flow of operation comes to execute the step S105 and steps subsequent to the step S105.

When the arrangement of the interchangeable lens 2 is found at the step S301 not to correspond with the second communication method, the result of check of course represents a case where an interchangeable lens of the old type is mounted on a camera body which is arranged to correspond with the new communication method. In this case, the advantageous effect of the first embodiment described in the foregoing cannot be attained even if there is a sufficient margin in the suppliable power of the power source battery, that is, the speed of computing and processing operations cannot be increased by increasing the amount of power consumable by the control system circuit and the speed of driving also cannot be increased by increasing the amount of power consumable by the driving system circuit within the interchangeable lens 2, because the processes of the steps S103 and S104 cannot be carried out. However, even in this case, the arrangement of the second embodiment makes the camera system usable in the same manner as the conventional camera system, because all the processes other than the processes of the steps S103 and S104 can be carried out in this case.

The operation to be performed by the lens CPU 17 which is disposed on the side of the interchangeable lens 2 is next described with reference to the flow chart of FIG. 7. In the flow chart of FIG. 7, all the steps other than a step S401 are identical with the steps S201 to S210 of FIG. 5 already described as steps of the first embodiment and are, therefore, omitted from the following description.

At the step S401 of FIG. 7, an instruction given from the camera body 1 is checked to find if it is given for verifying that the arrangement of the interchangeable lens 2 corresponds with the second communication method. If so, since the instruction is recognizable as the interchangeable lens 2 itself is arranged to correspond with the second communication method in this case, the flow of operation proceeds to the step S210 to communicate the above-stated ID code to the camera body 1. If not, i.e., if the instruction from the camera body 1 is found to be not for verification of the communication method, the flow comes to execute the step S211 and steps subsequent to the step S211. Processes of the step S202 and the next step S203 are performed in the same manner as the manner described in the foregoing description of FIG. 5 except that, in the case of the second embodiment, these steps are executed according to instructions which are in conformity with the second communication method and not in conformity with the conventional (old) communication method. Further, the step S211 is provided for checking the instruction given at the step S103. If the instruction from the camera body 1 is for checking the state of the interchangeable lens 2, the flow proceeds to the step S210. Then, at the step S210, the data of the above-stated level values stored within the interchangeable lens 2 is communicated to the camera body 1.

Further, in a case where an interchangeable lens which is arranged to correspond with the new (second) communication method is mounted on a camera body of the old type, it is impossible to attain, even if there is a sufficient margin in the suppliable power of the power source battery, the advantageous effect of the first embodiment described in the foregoing, i.e., the speed of computing and processing operations can be increased by increasing the amount of power consumable by the control system circuit and the speed of driving can be increased by increasing the amount of power consumable by the driving system circuit within the interchangeable lens 2. However, even in this case, the arrangement of the second embodiment makes the camera system usable in the same manner as the conventional camera system, because all the processes other than the processes of the steps S202 and S203 can be carried out.

The arrangement of the second embodiment described above enables a camera system composed of a camera body 1 corresponding with the new communication method (permitting the processes of FIG. 6) and an interchangeable lens 2 also corresponding with the new communication method (permitting the processes of FIG. 7) to have the same advantage as the advantage of the first embodiment described in the foregoing. In other words, in a case where there is some margin left in the suppliable power of the power source battery disposed within the camera body 1, the speed of computing and processing operations and also the driving speed can be increased by increasing the amounts of power consumable by the control system circuit and the driving system circuit within the interchangeable lens 2 which is employed, by way of example, as an accessory in the camera system.

Further, unlike any of known arrangements, the novel arrangement of giving an instruction designating the permissible amount of power consumption without affecting the old type communication with an interchangeable lens enables a camera system to perform a normal photo-taking operation without any malfunction even when a camera body and an interchangeable lens of old and new types are combined with each other in the camera system.

While each of the embodiments disclosed is using an interchangeable lens as an accessory in the camera system, the camera system according to the invention is not limited to the use of an interchangeable lens. The invention is applicable to the camera system of any other types wherein a flash device, a motor drive or some other accessory is connected to a camera body, or a camera in the event of a lens-integrated type camera, having a power source battery disposed therein.

The camera system arranged according to the invention, as described above, is capable of allowing an accessory to fully exert its operating capability. Even when the new and old methods of communication between a camera body and an accessory are combined in a camera system, the arrangement according to the invention enables the camera system, the camera body and the accessory to adequately carry out photo-taking operations.

What is claimed is:

1. A camera system composed of a camera capable of containing a battery therein and an accessory capable of being detachably mounted on said camera and being supplied with electric power from said camera, communication being possible between communication means of said camera and communication means of said accessory, said accessory, upon receiving an instruction from said camera, performing an operation according to the received instruction, said camera system comprising:

a circuit which sends an instruction designating a value corresponding to electric power usable by said accessory from said camera to said accessory, to decide a working power or voltage usable in said accessory selected from among a plurality of working powers or voltages.

2. A camera system according to claim 1, wherein the instruction is determined according to a state of said battery and a state of a control circuit of said accessory.

3. A camera system according to claim 1, wherein the instruction is determined according to a state of said battery and a state of a driving circuit of said accessory.

4. A camera system according to claim 1, wherein the instruction is determined according to a state of said battery and states of a control circuit and a driving circuit of said accessory.

5. A camera having communication means for communicating with communication means of an accessory mounted on said camera and being capable of containing therein a battery serving also as a power source of said accessory, said camera comprising:

an instruction circuit which sends, to said accessory through said communication means, an instruction designating a value corresponding to electric power usable by said accessory, to designate a value corresponding to a working power in said accessory selected from among a plurality of working powers.

6. An accessory adapted to be detachable mounted on a camera and having communication means for communicating with communication means of said camera, said accessory being supplied with electric power from said camera and performing, upon receiving an instruction from said camera, an operation according to the received instruction, said accessory comprising:

a deciding circuit which decides a value corresponding to a working power on the basis of an instruction sent from said camera designating a value corresponding to electric power usable by said accessory selected from among a plurality of electric powers.

7. An accessory according to claim 6, wherein the instruction is determined according to a state of electric power of said camera and a state of a control circuit of said accessory.

8. An accessory according to claim 6, wherein the instruction is determined according to a state of electric power of said camera and a state of a driving circuit of said accessory.

9. An accessory according to claim 6, wherein the instruction is determined according to a state of electric power of said camera and states of a control circuit and a driving circuit of said accessory.

10. A camera system composed of a camera capable of containing a battery therein and an accessory capable of being detachably mounted on said camera and being supplied with electric power from said camera, communication being possible between communication means of said camera and communication means of said accessory, said accessory performing an operation on the basis of an instruction from said camera, said camera system comprising:

signal output means, disposed in said accessory, for outputting a signal required by an instruction received from said camera, if an operation corresponding to the instruction is possible even if the instruction is designating a value corresponding to electric power usable by said accessory; and signal recognition means, disposed in said camera, for recognizing the signal from said accessory, wherein, upon recognizing the signal by said signal recognition means, an instruction designating a value corresponding to electrical power usable by said accessory is sent from said camera to said accessory to decide a working voltage in said accessory selected from among a plurality of working voltages.

11. A camera having communication means for communicating with communication means of an accessory mounted on said camera and being capable of containing therein a battery serving also as a power source of said accessory, said camera comprising:

a deciding and instructing circuit which, upon recognizing receipt from said accessory of a signal required for an instruction designating a value corresponding to electric power usable by said accessory, sends the information to said accessory, to designate a value corresponding to a working power in said accessory selected from among a plurality of working powers.

12. An accessory adapted to be detachably mounted on a camera and having communication means for communicating with communication means of said camera, said accessory being supplied with electric power from said camera and performing, upon receiving an instruction from said camera, an operation according to the received instruction, said accessory comprising:

a deciding circuit which outputs a signal required by an instruction received from said camera, if an operation corresponding to the instruction is possible even if the instruction is a specific instruction designating a value corresponding to electric power usable by said accessory, and decides a value corresponding to a working power selected from a plurality of working powers on the basis of the specific instruction sent from said camera in response to the signal.

13. A camera system composed of a camera capable of containing a battery therein and an accessory adapted to be mounted on said camera and supplied with electric power from said battery, said camera and said accessory communicating with each other, said camera system comprising:

a circuit, disposed in said camera, which receives, through communication with said accessory, intrinsic data of said accessory mounted on said camera and limits a working power or voltage of said accessory to one of a plurality of working powers or voltages on the basis of the intrinsic data.

14. A camera for use in a camera system composed of said camera capable of containing a battery therein and an accessory adapted to be mounted on said camera and supplied with electric power from said battery, said camera and said accessory communicating with each other, said camera comprising:

a circuit which receives, through communication with said accessory, intrinsic data of said accessory mounted on said camera and limits a working power or voltage of said accessory to one of a plurality of working powers or voltages on the basis of the intrinsic data.

15. An accessory for use in a camera system composed of a camera capable of containing a battery therein and said accessory adapted to be mounted on said camera and supplied with electric power from said battery, said camera and said accessory communicating with each other, said accessory comprising:

intrinsic data provided for limiting electric power or a voltage supplied from said camera to one of a plurality of electric powers or voltages; and communication means for communicating the intrinsic data from said accessory to said camera.

16. A camera system according to claim 13, wherein said camera limits electric power or a voltage to be supplied to said accessory, on the basis of a state of said battery and the intrinsic data.

17. A camera according to claim 14, wherein said camera limits electric power or a voltage to be supplied to said accessory, on the basis of a state of said battery and the intrinsic data.

18. An accessory according to claim 15, wherein said camera limits electric power or a voltage to be supplied to said accessory, on the basis of a state of said battery and the intrinsic data.

19. A camera system according to claim 13, wherein said camera prepares data for limiting the electric power or the voltage on the basis of the intrinsic data, and transmits the prepared data to said accessory.

20. A camera according to claim 14, wherein said camera prepares data for limiting the electric power or the voltage on the basis of the intrinsic data, and transmits the prepared data to said accessory.

21. An accessory according to claim 15, wherein said camera prepares data for limiting the electric power or the voltage on the basis of the intrinsic data, and transmits the prepared data to said accessory.

22. A camera system according to claim 16, wherein said camera prepares data for limiting the electric power or the voltage on the basis of the state of said battery and the intrinsic data, and transmits the prepared data to said accessory.

23. A camera according to claim 17, wherein said camera prepares data for limiting the electric power or the voltage on the basis of the state of said battery and the intrinsic data, and transmits the prepared data to said accessory.

24. An accessory according to claim 18, wherein said camera prepares data for limiting the electric power or the voltage on the basis of the state of said battery and the intrinsic data, and transmits the prepared data to said accessory.

25. A camera system according to claim 19, wherein said accessory has a control circuit which decides a controlled state of said accessory on the basis of the data prepared by said camera.

26. A camera according to claim 20, wherein said accessory has a control circuit which decides a controlled state of said accessory on the basis of the data prepared by said camera.

27. An accessory according to claim 21, wherein said accessory has a control circuit which decides a controlled state of said accessory on the basis of the data prepared by said camera.

28. A camera system according to claim 13, wherein the intrinsic data represents a value corresponding to a working power of said accessory.

29. A camera according to claim 14, wherein the intrinsic data represents a value corresponding to a working power of said accessory.

30. An accessory according to claim 15, wherein the intrinsic data represents a value corresponding to a working power of said accessory.

31. A camera system composed of a camera and an accessory adapted to be mounted on said camera, said accessory interchangeably including a first-type accessory in which a working power or voltage thereof is limited on the basis of data prepared by said camera according to intrinsic data of said accessory and a second-type accessory which does not have the function of said first-type accessory of limiting a working power or voltage thereof, said camera system comprising:

a discriminating circuit which discriminates, through communication between said accessory and said camera, which of said first-type accessory and said second-type accessory is mounted on said camera;

a data forming circuit, disposed in said camera, which prepares data for limiting the working power or voltage to one of a plurality of working powers or voltages on the basis of the intrinsic data, when said first-type accessory is found by said discriminating circuit to be mounted on said camera;

transmission means for transmitting the prepared data from said camera to said accessory; and a control circuit which inhibits preparation of the data for limiting the working power or voltage, when said second type accessory is found by said discriminating circuit to be mounted on said camera.

32. A camera system according to claim 31, wherein said data forming circuit prepares the data for limiting the working power or voltage, according to the intrinsic data and a state of a battery of said camera.

33. A camera system composed of a camera capable of containing a battery therein and an accessory adapted to be detachably mounted on said camera, said system comprising:

a vibration wave motor disposed in said accessory and serving as a drive source for an actuator disposed in said accessory; and a control circuit, disposed in said accessory, which enables switching of a working power of said accessory in a range of working powers when said vibration wave motor is driven.

34. A camera system according to claim 33, wherein said camera and said accessory are able to communicate with each other, and said control circuit selects a particular power range from among a plurality of ranges of the working power through communication from said camera to said accessory.

35. A camera for use in a camera system composed of said camera capable of containing a battery therein and an accessory adapted to be detachably mounted on said camera, said camera comprising:

a communicating device for communicating to said accessory an instruction for switching a working power of a vibration wave motor serving as a drive source for an actuator disposed in said accessory in a range of working powers.

36. An accessory for use in a camera system composed of a camera capable of containing a battery therein and said accessory adapted to be detachably mounted on said camera, said accessory comprising:

a control circuit which enables switching of a working power of a vibration wave motor serving as a drive source for an actuator disposed in said accessory in a range of working powers.

37. An accessory according to claim 36, wherein said control circuit selects a particular power range from among a plurality of ranges of the working power.

38. An accessory according to claim 37, wherein said control circuit selects the particular power range from among the plurality of ranges of the working area according to contents of communication from said camera to said accessory.

* * * * *

UNITED STATES PATENT AND TRADEMARK OFFICE
CERTIFICATE OF CORRECTION

PATENT NO. : 6,041,189
DATED : March 21, 2000
INVENTOR(S) : Kazuhiro Izukawa

It is certified that error appears in the above-identified patent and that said Letters Patent are hereby corrected as shown below:

Col. 2, line 27, delete "$V_3$" and insert --$V_B$--.

Col. 4, line 4, before "V" (first occurrence), insert --"--.
Col. 4, line 4, after "0" (second occurrence), insert --"--.
Col. 7, line 34, before "The" insert --[--.
Col. 7, line 34, after "supply" insert --]--.
Col. 7, line 53, before "The" insert "[".
Col. 7, line 53, after "supply" insert --]--.

Signed and Sealed this

Seventeenth Day of April, 2001

Attest:

NICHOLAS P. GODICI

*Attesting Officer*     *Acting Director of the United States Patent and Trademark Office*